US012327914B2

(12) United States Patent
Yamada et al.

(10) Patent No.: US 12,327,914 B2
(45) Date of Patent: Jun. 10, 2025

(54) ANTENNA MODULE AND COMMUNICATION DEVICE EQUIPPED WITH SAME

(71) Applicant: Murata Manufacturing Co., Ltd., Nagaokakyo (JP)

(72) Inventors: Yoshiki Yamada, Nagaokakyo (JP); Ryo Komura, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 168 days.

(21) Appl. No.: 18/238,533

(22) Filed: Aug. 28, 2023

(65) Prior Publication Data

US 2023/0411866 A1 Dec. 21, 2023

Related U.S. Application Data

(63) Continuation of application No. PCT/JP2022/005324, filed on Feb. 10, 2022.

(30) Foreign Application Priority Data

Mar. 2, 2021 (JP) ................................ 2021-032805

(51) Int. Cl.
*H01Q 21/00* (2006.01)
*H01Q 1/38* (2006.01)
*H01Q 1/50* (2006.01)

(52) U.S. Cl.
CPC ........... *H01Q 21/0006* (2013.01); *H01Q 1/38* (2013.01); *H01Q 1/50* (2013.01)

(58) Field of Classification Search
CPC ........ H01Q 21/0006; H01Q 1/38; H01Q 1/50; H01Q 5/40; H01Q 19/106; H01Q 9/0407; H01Q 1/243; H01Q 21/06
See application file for complete search history.

(56) References Cited

U.S. PATENT DOCUMENTS

2005/0099338 A1* 5/2005 Noro ........................ H01Q 1/52 343/846
2017/0069958 A1 3/2017 Ko et al.
(Continued)

FOREIGN PATENT DOCUMENTS

CN 107706500 A 2/2018
JP H03-173203 A 7/1991
(Continued)

OTHER PUBLICATIONS

International Search Report and Written Opinion mailed on May 10, 2022, received for PCT Application PCT/JP2022/005324, filed on Feb. 10, 2022, 8 pages including English Translation.

*Primary Examiner* — David E Lotter
(74) *Attorney, Agent, or Firm* — XSENSUS LLP

(57) ABSTRACT

An antenna module includes a dielectric substrate including a plurality of laminated dielectric layers, a radiating element, a ground electrode, and a peripheral electrode. The ground electrode opposes the radiating element. The peripheral electrode is on a layer between the radiating element and the ground electrode and electrically connected to the ground electrode. The radiating element radiates a radio wave in a first polarization direction. A dimension of the ground electrode in the first polarization direction is shorter than a dimension of the ground electrode in a specific direction orthogonal to the first polarization direction. When the dielectric substrate is seen in plan view in a layered direction, at least a portion of the peripheral electrode is disposed between an end portion of the ground electrode and an end portion of the radiating element in the first polarization direction.

20 Claims, 8 Drawing Sheets

(56) References Cited

U.S. PATENT DOCUMENTS

| | | | | |
|---|---|---|---|---|
| 2017/0214139 | A1* | 7/2017 | Tenno .................... | H01Q 11/08 |
| 2023/0024260 | A1* | 1/2023 | Choi .................... | H01Q 1/2283 |

FOREIGN PATENT DOCUMENTS

| | | | |
|---|---|---|---|
| JP | 2005-142786 | A | 6/2005 |
| JP | 6798657 | B1 | 12/2020 |

* cited by examiner

ANTENNA MODULE AND COMMUNICATION DEVICE EQUIPPED WITH SAME

CROSS-REFERENCE TO RELATED APPLICATIONS

This application is a continuation of, and claims the benefit of priority to, international application no. PCT/JP2022/005324, filed Feb. 10, 2022, which claims priority to Japanese patent application no. JP 2021-032805, filed Mar. 2, 2021. The entire contents of the prior applications are hereby incorporated by reference.

TECHNICAL FIELD

The present disclosure relates to an antenna module, and a communication device equipped with the same, with improved antenna characteristics.

BACKGROUND ART

A configuration of an antenna module includes a planar-shaped patch antenna where a polarization direction of a radiating element is arranged to be inclined with respect to a dielectric substrate. The antenna module makes securing of distance in the polarization direction between the radiating element and a ground electrode easier even when an area of the ground electrode is limited, and thus, decrease in antenna characteristics can be suppressed.

CITATION LIST

Patent Document

Patent Document 1: Japanese Patent No. 6798657

SUMMARY

Technical Problem

In terms of communication devices represented by portable terminals, such as cellular phones and smartphones, further reduction in size and thickness is desired. Along with this, an antenna module equipped in the communication device is also required to be reduced in size and height or thickness. Moreover, reduction in size of the communication device may lead to limitation in installation location of the antenna module in the device. In this case, there is a possibility that an area of a ground electrode in the antenna module cannot sufficiently be secured.

Generally, a patch antenna having a planar shape can include a ground electrode having a sufficiently wide area with respect to a radiating element, from the perspective of antenna characteristics such as widening of a frequency bandwidth and loss reduction. However, when the size of the ground electrode is limited due to the size reduction as described above, it is possible that desired antenna characteristics cannot be achieved.

Regarding such a problem, by the polarization direction of the radiating element being inclined with respect to the ground electrode, decrease in antenna characteristics can be suppressed. However, depending on a mounting aspect of the antenna module, there is a case where the polarization direction cannot be inclined due to effects of interaction with a housing of the communication device, and so on. In this case, it is possible that desired antenna characteristics cannot be achieved.

One aspect of the present disclosure solves the above problem, and, as such, suppresses a decrease in antenna characteristics in an antenna module when an area of a ground electrode is limited.

Exemplary Solution to Problem

An antenna module according to the present disclosure includes: a dielectric substrate in which a plurality of dielectric layers are laminated; a first radiating element; a ground electrode; and a first peripheral electrode. The first radiating element is provided to the dielectric substrate and has a planar shape. The ground electrode is provided to the dielectric substrate to be opposed to the first radiating element. The first peripheral electrode is provided to a layer between the first radiating element and the ground electrode and electrically connected to the ground electrode. The first radiating element is configured to radiate a radio wave in a first polarization direction. A dimension of the ground electrode in the first polarization direction is shorter than a dimension of the ground electrode in a specific direction orthogonal to the first polarization direction. When the dielectric substrate is seen in plan view in a layered direction, at least a portion of the first peripheral electrode is disposed between an end portion of the ground electrode and an end portion of the first radiating element in the first polarization direction.

Effects

In the antenna module according to the present disclosure, the peripheral electrode increases a capacitance component between the radiating element and the ground electrode, and therefore a desired resonant frequency can be achieved even when the dimension of the radiating element is shortened. Moreover, lines of electric force going around from the radiating element to the ground electrode are reduced by the peripheral electrode. Therefore, even when the ground electrode has a limited area, decrease in antenna characteristics can be suppressed.

DETAILED DESCRIPTION OF EXEMPLARY EMBODIMENTS

Figure 1:
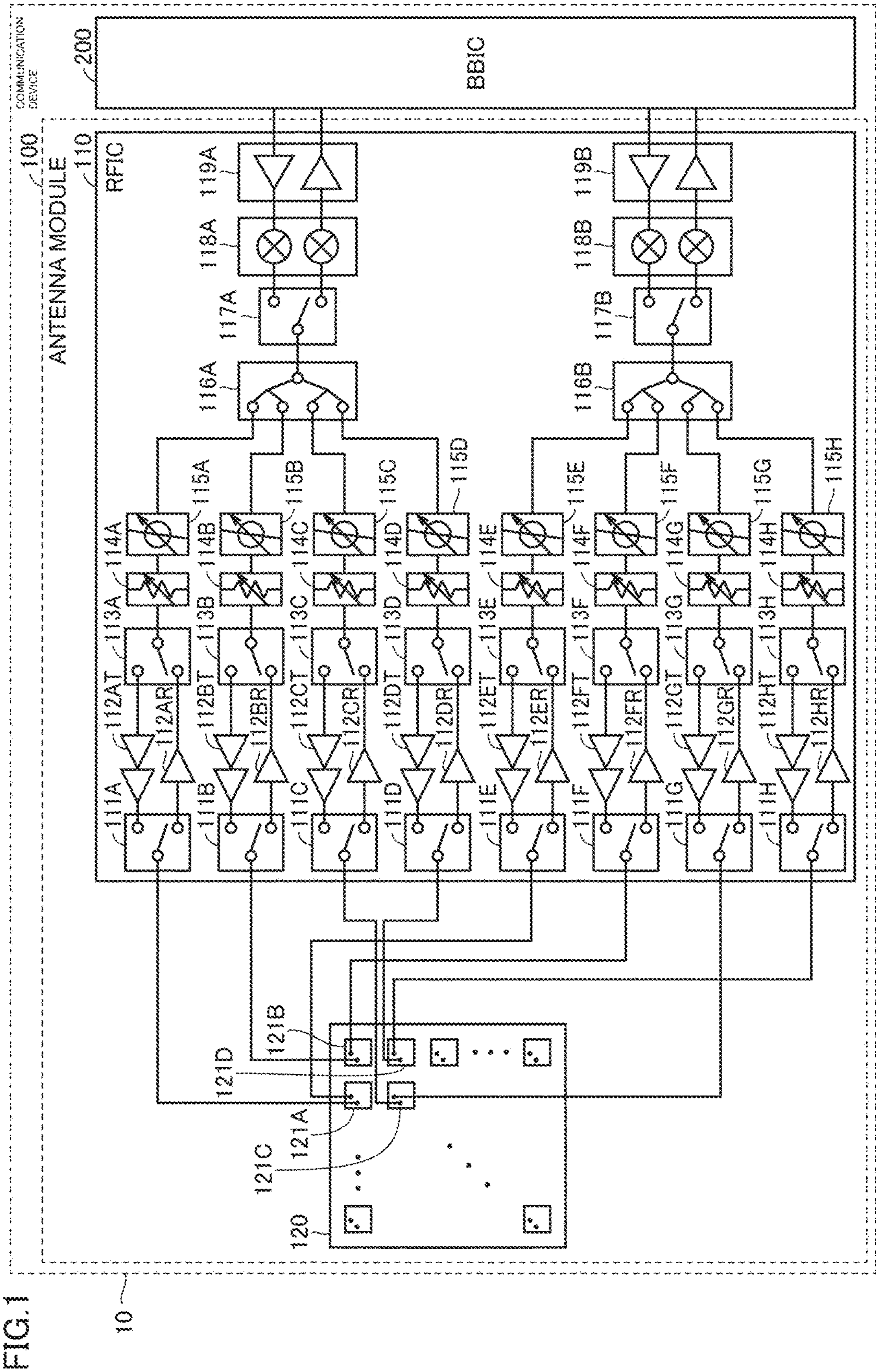
FIG. 1 is a block diagram of a communication device to which an antenna module according to exemplary Embodiment 1 is applied.

Hereinafter, exemplary embodiments of the present disclosure are described in detail with reference to the drawings. Note that the same reference characters are given to the same or corresponding components in the drawings, and description thereof is not repeated.

Embodiment 1

(Basic Configuration of Communication Device)

FIG. 1 is one example of a block diagram of a communication device 10 to which an antenna module 100 according to exemplary Embodiment 1 is applied. The communication device 10 is, for example, a portable terminal such as a cellular phone, a smartphone, and a tablet, or a personal computer having a communication function. One example of a frequency band of radio waves used for the antenna module 100 according to this exemplary embodiment is, for example, radio waves in a millimeter-wave band whose center frequency is at 28 GHz, 39 GHz, 60 GHz, and so on. However, radio waves in a frequency band other than the band described above are also applicable.

With reference to FIG. 1, the communication device 10 includes the antenna module 100 and a BBIC 200 which constitutes a base band signal processing circuit. The antenna module 100 includes an RFIC 110 which is one example of a feed circuit, and an antenna device 120. The communication device 10 upconverts a signal transmitted from the BBIC 200 to the antenna module 100 into a radio frequency signal in the RFIC 110, and radiates the upconverted signal from the antenna device 120. Moreover, the communication device 10 transmits a radio frequency signal received by the antenna device 120 to the RFIC 110, and downconverts the signal to process it in the BBIC 200.

In FIG. 1, in order to make description easier, a configuration corresponding to four radiating elements 121A to 121D (hereinafter, also comprehensively referred to as a "radiating element 121") among a plurality of radiating elements (feed elements) which constitute the antenna device 120 is only illustrated, and a configuration corresponding to the other radiating element having a similar configuration is omitted. Note that although FIG. 1 shows an example in which the antenna device 120 includes the plurality of radiating elements 121 arranged in a two-dimensional array form, the plurality of radiating elements 121 may form a one-dimensional array arranged in a single row. Moreover, the antenna device 120 may be provided with a single radiating element 121. In this exemplary embodiment, the radiating element 121 is a patch antenna having a planar shape.

The antenna device 120 is an antenna device of what is called a dual polarization type which is capable of radiating, from a single radiating element, two types of radio waves having different polarization directions. The RFIC 110 supplies, to each radiating element 121, a radio frequency signal for a first polarization, and a radio frequency signal for a second polarization.

The RFIC 110 includes switches 111A to 111H, 113A to 113H, 117A, and 117B, power amplifiers 112AT to 112HT, low noise amplifiers 112AR to 112HR, attenuators 114A to 114H, phase shifters 115A to 115H, signal combiner/splitters 116A and 116B, mixers 118A and 118B, and amplifier circuits 119A and 119B. Among these, the switches 111A to 111D, 113A to 113D, and 117A, the power amplifiers 112AT to 112DT, the low noise amplifiers 112AR to 112DR, the attenuators 114A to 114D, the phase shifters 115A to 115D, the signal combiner/splitter 116A, the mixer 118A, and the amplifier circuit 119A constitute a circuit for a radio frequency signal for the first polarization. Moreover, the switches 111E to 111H, 113E to 113H, and 117B, the power amplifiers 112ET to 112HT, the low noise amplifiers 112ER to 112HR, the attenuators 114E to 114H, the phase shifters 115E to 115H, the signal combiner/splitter 116B, the mixer 118B, and the amplifier circuit 119B constitute a circuit for a radio frequency signal for the second polarization.

In a case of transmitting a radio frequency signal, the switches 111A to 111H and 113A to 113H are switched to the power amplifiers 112AT to 112HT side, and the switches 117A and 117B are connected to transmission-side amplifiers of the amplifier circuits 119A and 119B. In a case of receiving a radio frequency signal, the switches 111A to 111H and 113A to 113H are switched to the low noise amplifiers 112AR to 112HR side, and the switches 117A and 117B are connected to reception-side amplifiers of the amplifier circuits 119A and 119B.

A signal transmitted from the BBIC 200 is amplified in the amplifier circuits 119A and 119B, and upconverted in the mixers 118A and 118B. The transmission signal which is the upconverted radio frequency signal is split into four-type waves in the signal combiner/splitters 116A and 116B, and the split signals pass through the corresponding signal paths to be fed to the radiating elements 121 different from each other. Here, a degree of phase shift in each of the phase shifters 115A to 115H provided to the corresponding signal path is independently adjusted, and thus, a directivity of the antenna device 120 can be adjusted.

Radio frequency signals from the switches 111A and 111E are supplied to the radiating element 121A. Similarly, radio frequency signals from the switches 111B and 111F are supplied to the radiating element 121B. Radio frequency signals from the switches 111C and 111G are supplied to a radiating element 121C. Radio frequency signals from the switches 111D and 111H are supplied to a radiating element 121D.

Reception signals which are radio frequency signals received by the respective radiating elements 121 are transmitted to the RFIC 110, and are synthesized in the signal combiner/splitters 116A and 116B via four signal paths different from each other. The synthesized reception signal is downconverted in the mixers 118A and 118B, and amplified in the amplifier circuits 119A and 119B to be transmitted to the BBIC 200.

(Structure of Antenna Module)

Figure 2:
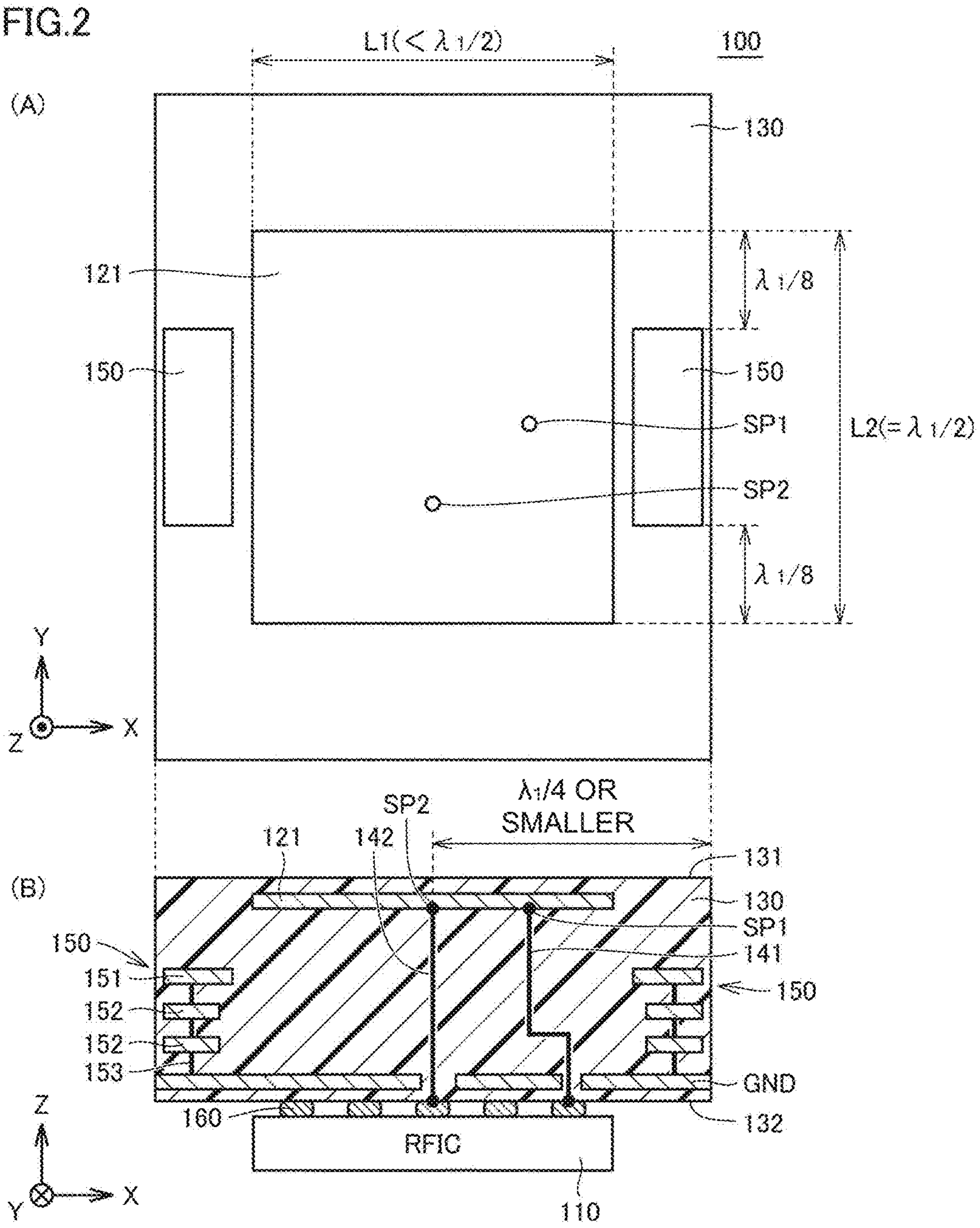
FIG. 2(A) is a plan view of the antenna module in FIG. 1.
FIG. 2(B) is a side transparent view of the antenna module in FIG. 1.

Next, a configuration of the antenna module 100 in exemplary Embodiment 1 is described in detail with reference to FIG. 2. FIG. 2 is a view illustrating the antenna module 100 according to exemplary Embodiment 1. In FIG. 2, a plan view (FIG. 2(A)) of the antenna module 100 is illustrated in the upper part, and a side transparent view (FIG. 2(B)) is illustrated in the lower part.

The antenna module 100 includes, in addition to the radiating element 121 and the RFIC 110, a dielectric substrate 130, feed wirings 141 and 142, a peripheral electrode 150, and a ground electrode GND. Note that, in the following description, a normal direction of the dielectric substrate 130 (a radiation direction of a radio wave) is defined as Z-axis direction, and planes vertical to the Z-axis direction are defined by an X axis and a Y axis. Moreover, in each drawing, a positive direction of the Z axis may be referred to as an upper side, and a negative direction thereof may be referred to as a lower side.

The dielectric substrate 130 is, for example, a low temperature co-fired ceramics (LTCC) multilayer substrate, a multilayer resin substrate formed by a plurality of resin layers made of epoxy resin, polyimide resin, and so on, being laminated, a multilayer resin substrate formed by a plurality of resin layers made of liquid crystal polymer (LCP) having a lower permittivity being laminated, a multilayer resin substrate formed by a plurality of resin layers made of fluorine-based resin being laminated, a multilayer resin substrate formed by a plurality of resin layers made of polyethylene terephthalate (PET) material being laminated, or a ceramics multilayer substrate other than LTCC. Note that the dielectric substrate 130 does not necessarily have a multilayer structure, but may have a single layer structure.

The dielectric substrate 130 has a rectangular shape in plan view in the normal direction (Z-axis direction). A dimension of the dielectric substrate 130 along the X axis is shorter than a dimension thereof along the Y axis. The radiating element 121 is provided to a layer (an upper side layer) close to an upper surface 131 (a surface in the Z-axis positive direction) of the dielectric substrate 130. The radiating element 121 may be provided to be exposed to a surface of the dielectric substrate 130, or may be provided inside the dielectric substrate 130 like the example in FIG. 2(B).

The ground electrode GND is provided over the entire surface of the dielectric substrate 130 at a position close to a lower surface 132 of the dielectric substrate 130. Moreover, the RFIC 110 is mounted to the lower surface 132 of the dielectric substrate 130 with a solder bump 160 interposed therebetween. Note that the RFIC 110 may be connected to the dielectric substrate 130 using a multipole connector instead of the solder connection.

The radiating element 121 is an electrode having a rectangular planar shape. A dimension L1 of a side (first side) of the radiating element 121 along the X-axis direction is shorter than a dimension L2 of a side (second side) of the radiating element 121 along the Y-axis direction (L1<L2). This is because the dimension of the dielectric substrate 130 in the X-axis direction is limited more than the dimension in the Y-axis direction. In the antenna module 100, when a wavelength of a radio wave radiated from the radiating element 121 is $\lambda_1$, a distance from the center of the radiating element 121 to the side of the dielectric substrate 130 along the Y axis is $\lambda_1/4$ or smaller. A radio frequency signal is independently supplied from the RFIC 110 to the radiating element 121 with the feed wirings 141 and 142 interposed therebetween. Note that the radiating element 121 is not necessarily limited to have a rectangular shape, but may have, for example, a circular shape, an oval shape, or another polygonal shape.

The feed wiring 141 is connected from the RFIC 110 to a feed point SP1 of the radiating element 121 while penetrating the ground electrode GND. Moreover, the feed wiring 142 is connected from the RFIC 110 to a feed point SP2 of the radiating element 121 while penetrating the ground electrode GND. The feed point SP1 is offset from the center of the radiating element 121 to an X-axis positive direction, and the feed point SP2 is offset from the center of the radiating element 121 to a Y-axis negative direction. Therefore, a radio wave whose polarization direction is the X-axis direction, and a radio wave whose polarization direction is the Y-axis direction are radiated from the radiating element 121. That is, the antenna module 100 is an antenna module of a dual polarization type.

In the antenna module 100, the peripheral electrode 150 is provided to a dielectric layer between the radiating element 121 and the ground electrode GND at an end portion of the dielectric substrate 130 in the X-axis direction. When seen in plan view in the normal direction of the dielectric substrate 130 (from the Z-axis positive direction), the peripheral electrode 150 has a rectangular shape and extends in the Y-axis direction at the end portion of the dielectric substrate 130 in the X-axis direction. The peripheral electrode 150 is disposed at a center portion of the side of the radiating element 121 along the Y-axis direction in order to secure a symmetric property of a radiated radio wave. Note that the peripheral electrode 150 is not necessarily limited to have a rectangular shape, but may have, for example, an oval shape, a quadrilateral shape having curved corners, or another polygonal shape.

A dimension of the peripheral electrode 150 in the Y-axis direction is shorter than the dimension of the radiating element 121 in the Y-axis direction. The dimension L2 of the side of the radiating element 121 along the Y axis is $\times_1/2$. The peripheral electrode 150 is disposed at a position where a distance in the Y-axis direction between the side of the radiating element 121 along the X axis and the peripheral electrode 150 is at least $\lambda_1/8$. When the dimension of the peripheral electrode 150 along the Y axis is about the same as the dimension of the opposed side of the radiating element 121, antenna characteristics such as a frequency bandwidth and/or an antenna gain of a radio wave whose polarization direction is the Y-axis direction may decrease. Therefore, in the antenna module 100, in order that the peripheral electrode 150 is not located too close to the end portion of the radiating element 121, the peripheral electrode 150 is disposed such that a distance along the Y axis to each side of the radiating element 121 along the X axis is at least $\lambda_1/8$. Therefore, decrease in antenna characteristics of a radio wave whose polarization direction is the X-axis direction, and a radio wave whose polarization direction is the Y-axis direction can be suppressed.

In the layered direction (Z-axis direction) of the dielectric substrate 130, the peripheral electrode 150 includes a plate electrode 151 (first electrode) provided to a layer closest to the radiating element 121, and a plurality of plate electrodes 152 (second electrodes) provided to layers between the plate electrode 151 and the ground electrode GND. The plate electrode 151 and the plurality of plate electrodes 152 are connected to each other by a via 153. The via 153 is connected to the ground electrode GND. Thus, a potential of the peripheral electrode 150 becomes a ground potential.

(Function of Peripheral Electrode)

Figure 3:
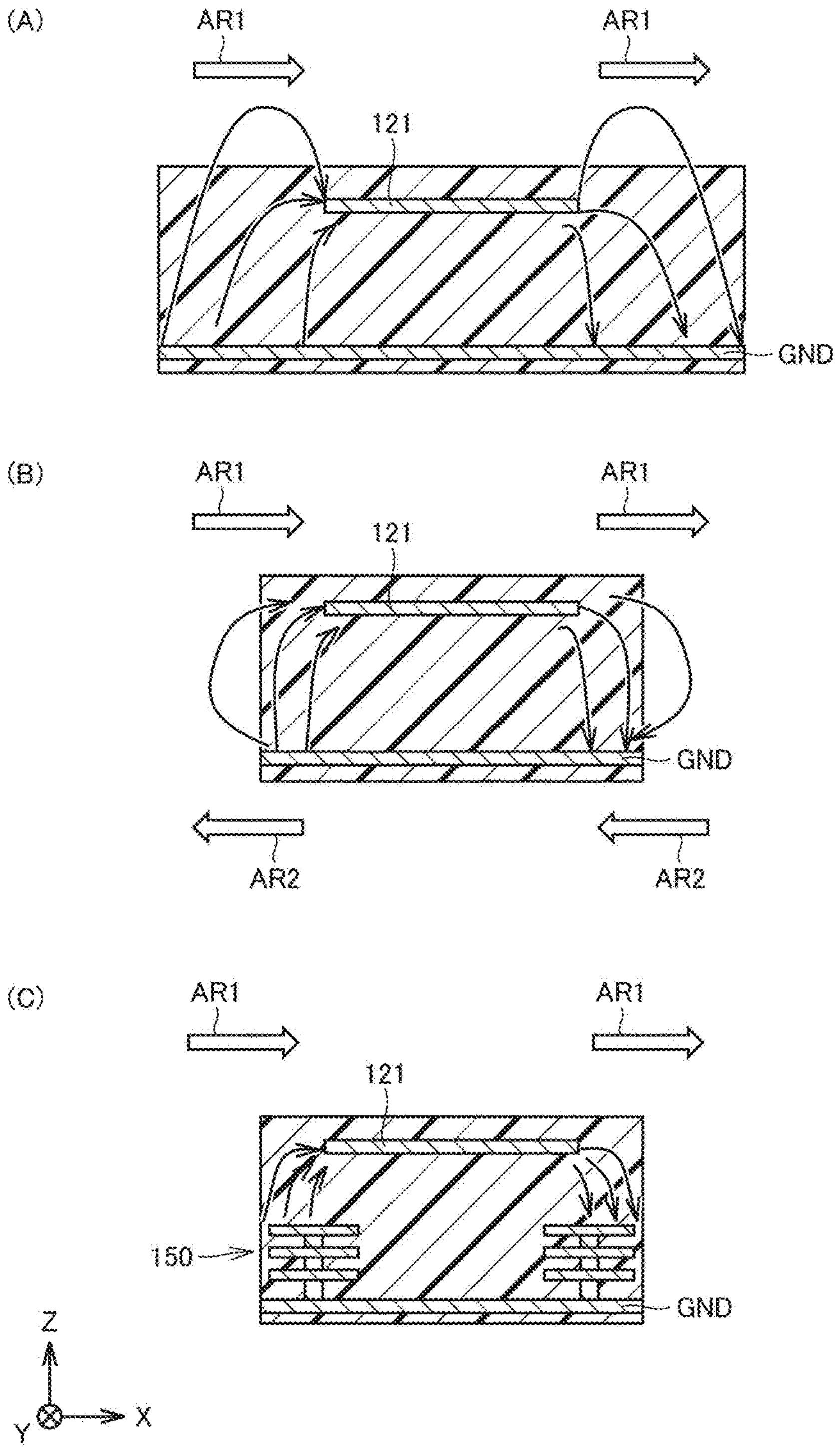
FIG. 3(A) is a diagram illustrating effects of a peripheral electrode.
FIG. 3(B) is another diagram illustrating the effects of the peripheral electrode.
FIG. 3(C) is a further diagram illustrating the effects of the peripheral electrode.

Next, a function of the peripheral electrode 150 is described with reference to FIG. 3. FIG. 3 shows a schematic sectional view of the antenna module taken in the X-axis direction, and lines of electric force formed between the radiating element 121 and the ground electrode GND when a radio frequency signal is supplied to the radiating element 121 are illustrated.

In FIG. 3, FIG. 3(A) in an upper section illustrates a case in which the dielectric substrate 130 does not have size limitation, and an area of the ground electrode GND can be made sufficiently large. FIG. 3(B) in a middle section illustrates a case in which the dielectric substrate 130 has size limitation, and a dimension of the ground electrode GND in the X-axis direction cannot sufficiently be secured. FIG. 3(C) in a lower section illustrates a case of including the peripheral electrode 150 like the antenna module 100 in this Embodiment 1.

With reference to FIG. 3, when a radio frequency signal of a radio wave whose polarization direction is the X-axis direction is supplied to the radiating element 121, voltage at an end portion of the radiating element 121 in the X-axis direction (that is, at the side along the Y axis) becomes the largest, and a line of electric force occurs between the side along the Y axis and the ground electrode GND. As illustrated in FIG. 3(A), when the area of the ground electrode GND is sufficiently large with respect to the radiating element 121, an electric field from the end portion of the radiating element 121 is caused downwardly toward the ground electrode GND. Therefore, in the antenna module, a fringing electric field in the X-axis direction as indicated by an arrow AR1 is caused. In the patch antenna, a radio wave is radiated in the normal direction of the radiating element by this fringing electric field.

However, when the dimension of the dielectric substrate 130 in the X-axis direction is limited as illustrated in FIG. 3(B), an electric field going around toward an end portion of the ground electrode GND is partially caused from the end portion of the radiating element 121. Such a going-around electric field causes a fringing electric field in a direction opposite from the arrow AR1 as indicated by an arrow AR2. Therefore, the fringing electric field indicated by the arrow AR1 and the fringing electric field indicated by the arrow AR2 cancel out each other, and the magnitude of the fringing electric field of the antenna module as a whole becomes smaller. As a result, when compared to the case of FIG. 3(A), radiation of a radiation wave from the radiating element becomes more difficult and antenna characteristics may decrease.

Occurrence of such a fringing electric field in the opposite direction tends to be more distinct as the distance between the end portion of the radiating element 121 and the end portion of the ground electrode GND in the polarization direction becomes smaller. Therefore, like the X-axis direction of the antenna module 100 in FIG. 2, when the size of the dielectric substrate 130 (that is, the ground electrode GND) is limited with respect to the radiating element 121, characteristics of a radio wave whose polarization direction is the X-axis direction are interior to characteristics of a radio wave whose polarization direction is the Y-axis direction.

On the other hand, as illustrated in FIG. 3(C), when the peripheral electrode 150 connected to the ground electrode GND is provided between the radiating element 121 and the ground electrode GND, a distance between the radiating element 121 and the ground potential (peripheral electrode 150) becomes shorter. Therefore, a line of electric force preferentially occurs between the radiating element 121 and the peripheral electrode 150. Therefore, occurrence of an electric field going around toward the ground electrode GND as illustrated in FIG. 3(B) is reduced. Thus, occurrence of a fringing electric field in the opposite direction as indicated by the arrow AR2 in FIG. 3(B) is suppressed, and as a result, decrease in antenna characteristics can be suppressed.

Note that the peripheral electrode 150 is required to preferentially couple to the radiating element 121 over the ground electrode GND. Therefore, when the dielectric substrate 130 is seen in plan view, the peripheral electrode 150 may be disposed not to entirely overlap with the radiating element 121, but to have at least a portion projecting to the outside (polarization direction) of the radiating element 121.

Moreover, in the antenna module 100 in exemplary Embodiment 1, an area of the plate electrode 151 closest to the radiating element 121 is larger than an area of the plate electrode 152 so as to suppress coupling of the radiating element 121 to the plate electrode 152 on the lower-layer side. In other words, the dimension of the plate electrode 151 in the polarization direction (X-axis direction) is longer than the dimension of the plate electrode 152 in the polarization direction. Moreover, an end portion of the plate electrode 151 on the radiating element 121 side is disposed to be closer to the radiating element 121 than an end portion of the plate electrode 152 on the radiating element 121 side.

As described above, in the antenna module 100 of Embodiment 1, in terms of the direction (X-axis direction) in which the dimension of the ground electrode GND is limited with respect to the radiating element 121, by the peripheral electrode being provided to the layer between the radiating element 121 and the ground electrode GND so as to project from the radiating element 121, occurrence of an electric field which goes around between the radiating element 121 and the ground electrode GND can be suppressed. Therefore, since canceling out of the fringing electric field can be suppressed, decrease in antenna characteristics can be suppressed even when the area of the ground electrode GND is limited.

Embodiment 2

In exemplary Embodiment 1, the configuration is described in which the antenna module radiates radio waves in a single frequency band. In exemplary Embodiment 2, a configuration is described in which a peripheral electrode is applied to an antenna module which radiates radio waves in two different frequency bands.

Figure 4:
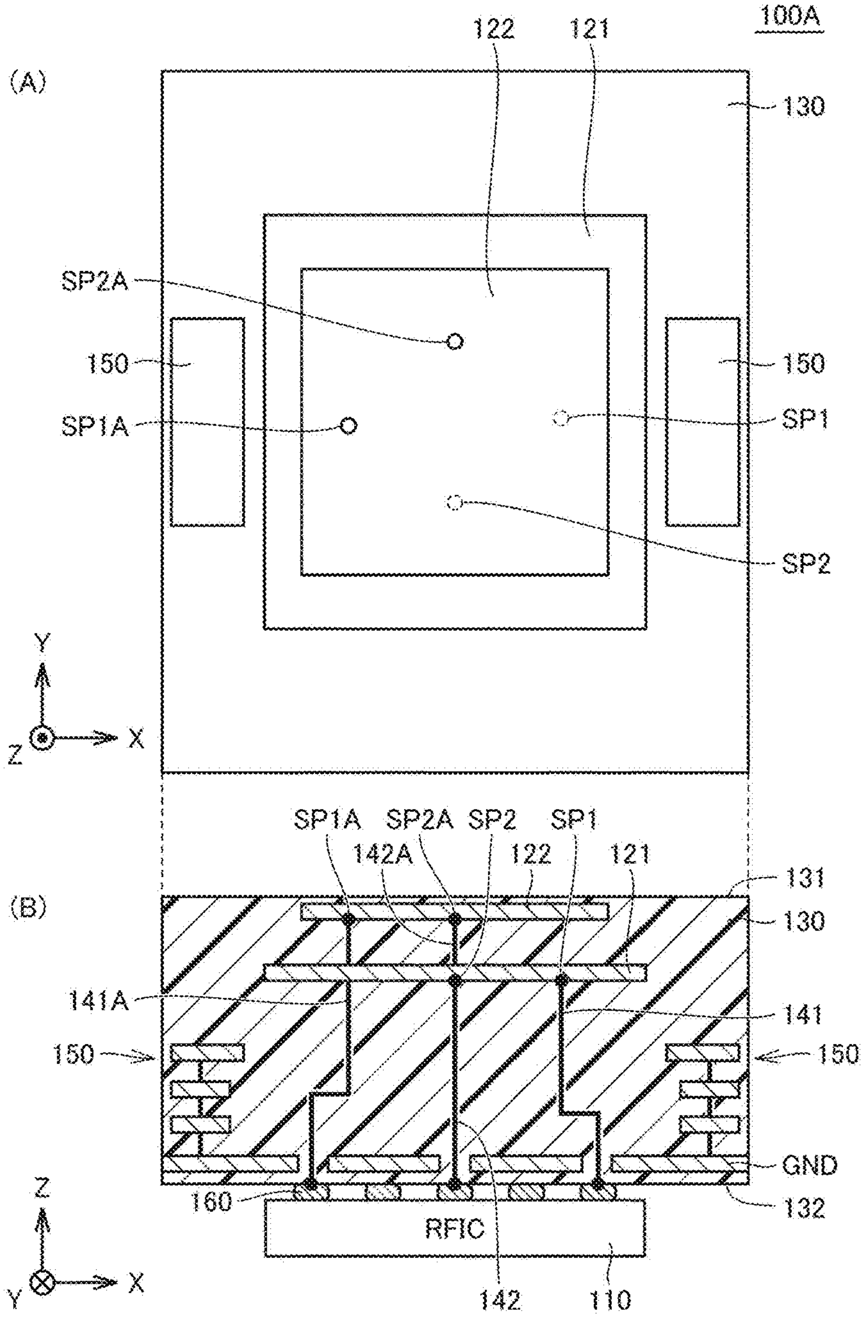
FIG. 4(A) is a plan view of an antenna according to exemplary Embodiment 2.
FIG. 4(B) is a side transparent view of the antenna module according to exemplary Embodiment 2.

FIG. 4 is a plan view and a side transparent view of an antenna module 100A according to exemplary Embodiment 2. The antenna module 100A in FIG. 4 includes a radiating element 122 and feed wirings 141A and 142A in addition to the configuration of the antenna module 100 in exemplary Embodiment 1 illustrated in FIG. 2. Note that, in the following description, description of components overlapping with the antenna module 100 is not repeated.

With reference to FIG. 4, in the antenna module 100A, the radiating element 122 is provided on the upper surface 131 side of the radiating element 121 in the dielectric substrate 130. In other words, the radiating element 121 is disposed between the radiating element 122 and the ground electrode GND. The radiating element 122 has a rectangular shape, and when the dielectric substrate 130 is seen in plan view in the layered direction (Z-axis direction), the radiating element 121 and the radiating element 122 overlap such that their centers coincide with each other. Note that the radiating element 122 is not necessarily limited to have a rectangular shape, but may have, for example, a circular shape, an oval shape, or another polygonal shape.

The size of the radiating element 122 is smaller than the size of the radiating element 121. Therefore, a radio wave in a frequency band higher than a frequency band of a radio wave radiated from the radiating element 121 is radiated from the radiating element 122. That is, the antenna module 100A is what is called a stack-type dual-band antenna module capable of radiating radio waves in two different frequency bands.

A radio frequency signal is independently supplied from the RFIC 110 to the radiating element 122 with the feed wirings 141A and 142A interposed therebetween. The feed wiring 141A is connected from the RFIC 110 to a feed point SP1A of the radiating element 122 while penetrating the ground electrode GND and the radiating element 121. Moreover, the feed wiring 142A is connected from the RFIC 110 to a feed point SP2A of the radiating element 122 while penetrating the ground electrode GND and the radiating element 121. The feed point SP1A is offset from the center of the radiating element 121 to the X-axis negative direction, and the feed point SP2A is offset from the center of the radiating element 121 to the Y-axis positive direction. Therefore, a radio wave whose polarization direction is the X-axis direction, and a radio wave whose polarization direction is the Y-axis direction are radiated from the radiating element 122.

Also in the antenna module 100A, similarly to the antenna module 100 in exemplary Embodiment 1, in terms of the polarization direction (X-axis direction) in which the area of the ground electrode GND is limited, the peripheral electrode 150 is provided to a layer between the radiating element 121 and the ground electrode GND. Therefore, regarding the radiating element 121 which radiates a radio wave in a relatively low frequency band, decrease in antenna characteristics due to limitation of the area of the ground electrode GND can be suppressed.

Note that the configuration is described in which, in the antenna module 100A, each of the two radiating elements 121 and 122 is a feed element, and a radio frequency signal is independently supplied from the RFIC 110. However, the lower-frequency radiating element 121 may be a parasitic element. In this case, the feed wirings 141A and 142A are connected to the radiating element 122 while penetrating the radiating element 121. When a radio frequency signal conforming to the radiating element 121 is supplied to the feed wirings 141A and 142A, the feed wirings 141A and 142A and the radiating element 121 are coupled to each other by electromagnetic field coupling, and thus the radio frequency signal is transmitted to the radiating element 121.

Embodiment 3

In exemplary Embodiment 2, the configuration is described in which, in the dual-band antenna module, the peripheral electrode provided to the layer between the radiating element and the ground electrode is used to suppress decrease in antenna characteristics of the lower-frequency radiating element.

In exemplary Embodiment 3, a configuration is described in which, in a dual-band antenna module, decrease in antenna characteristics of a radiating element which radiates a radio wave at a higher frequency is suppressed.

Figure 5:
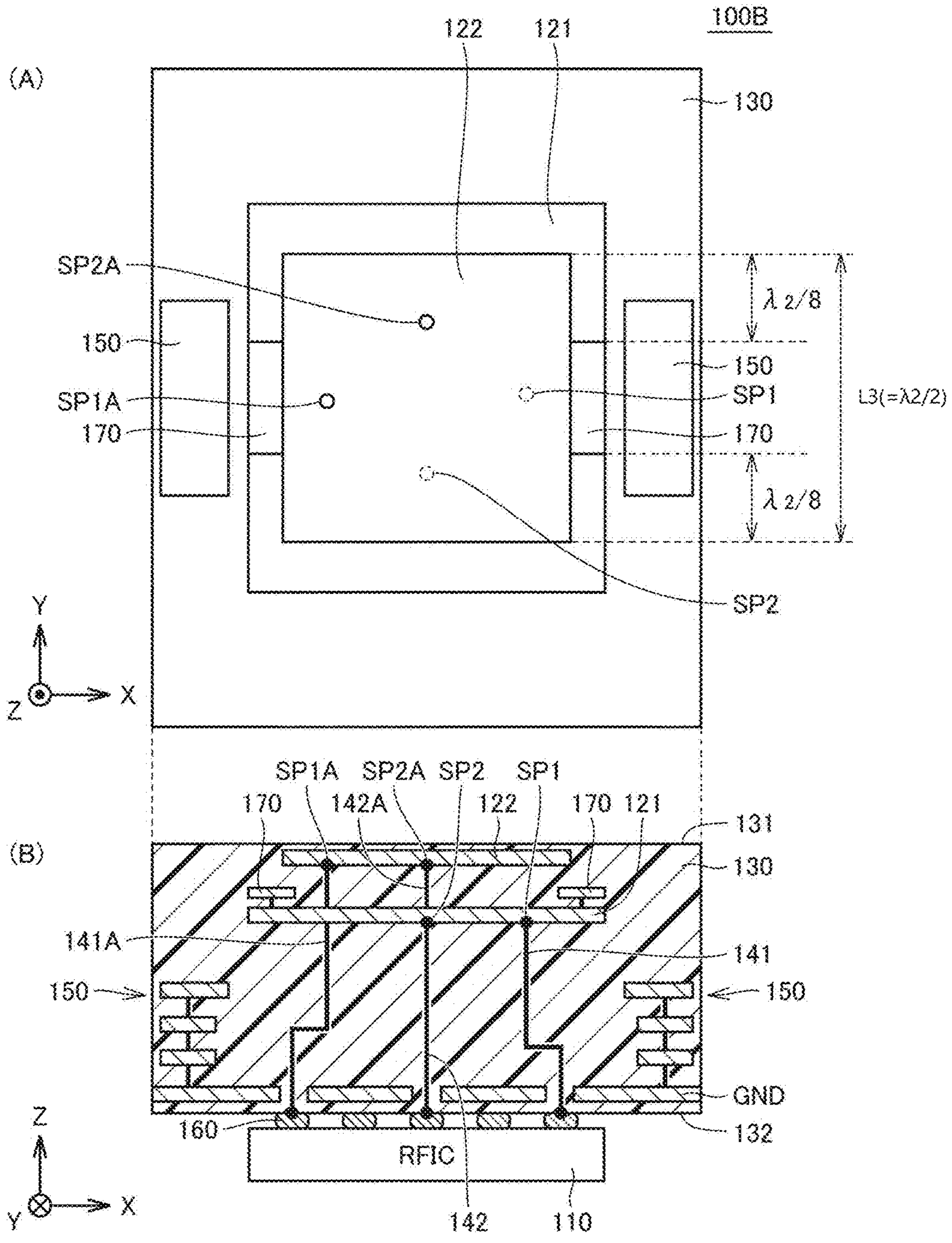
FIG. 5(A) is a plan view if an antenna module according to exemplary Embodiment 3.
FIG. 5(B) is a side transparent view of the antenna module according to exemplary Embodiment 3.

FIG. 5 is a plan view and a side transparent view of an antenna module 100B according to exemplary Embodiment 3. The antenna module 100B in FIG. 5 includes a peripheral electrode 170 for the radiating element 122 in addition to the configuration of the antenna module 100A in exemplary Embodiment 2 illustrated in FIG. 4. Note that, in the following description, description of components overlapping with the antenna modules 100 and 100A is not repeated.

With reference to FIG. 5, in the antenna module 100B, the peripheral electrode 170 having a rectangular shape is provided above the lower-frequency radiating element 121 along the Y-axis direction side of the radiating element 121. The peripheral electrode 170 is disposed at a center portion of the side of the radiating element 122 along the Y-axis direction.

A dimension of the peripheral electrode 170 in the Y-axis direction is smaller than the dimension of the radiating element 122 in the Y-axis direction. When a wavelength of a radio wave radiated from the radiating element 122 is $\lambda_2$, a dimension L3 of the side of the radiating element 122 along the Y-axis direction is $\lambda_2/2$. The peripheral electrode 170 is disposed at a position where a distance in the Y-axis direction between the side of the radiating element 122 along the X-axis direction and the peripheral electrode 170 is at least $\lambda_2/8$.

In a stack-type dual-band antenna module, the lower-frequency radiating element 121 functions as a ground electrode for the higher-frequency radiating element 122. Therefore, when the area of the radiating element 121 cannot sufficiently be secured with respect to the radiating element 122, decrease in characteristics as described with reference to FIG. 3 may occur in terms of a radio wave, at a higher frequency, radiated from the radiating element 122. Thus, in terms of the polarization direction (X-axis direction) in which the dimension of the radiating element 121 which functions as a ground electrode is limited, by the peripheral electrode 170 connected to the radiating element 121 being provided to the layer between the radiating element 121 and the radiating element 122, decrease in antenna characteristics of the radiating element 122 can be suppressed.

Note that, similarly to the case of the peripheral electrode 150, when the dielectric substrate 130 is seen in plan view, at least a portion of the peripheral electrode 170 can be disposed to project from the radiating element 122 in the polarization direction. In other words, at least a portion of the peripheral electrode 170 can be disposed between the end portion of the radiating element 121 and an end portion of the radiating element 122 in the X-axis direction. Moreover, in FIG. 5, the peripheral electrode 170 is provided with respect to a radio wave whose polarization direction is the X-axis direction. However, in terms of a radio wave whose polarization direction is the Y-axis direction, when the area of the radiating element 121 cannot sufficiently be secured with respect to the radiating element 122, the peripheral electrode 170 may be provided also regarding the Y-axis direction. Moreover, the peripheral electrode 170 is not necessarily limited to have a rectangular shape, but may have, for example, an oval shape, a quadrilateral shape having curved corners, or another polygonal shape.

As described above, by the peripheral electrodes being provided regarding the higher-frequency radiating element in addition to the lower-frequency radiating element, in the dual-band antenna module, decrease in antenna characteristics of radio waves in the respective frequency bands due to limitation of the area of the electrode which functions as the ground electrode can be suppressed.

Embodiment 4

In exemplary Embodiment 4, a configuration is described in which a parasitic element to widen a frequency bandwidth is further provided in addition to the configuration of the antenna module 100B in exemplary Embodiment 3.

Figure 6:
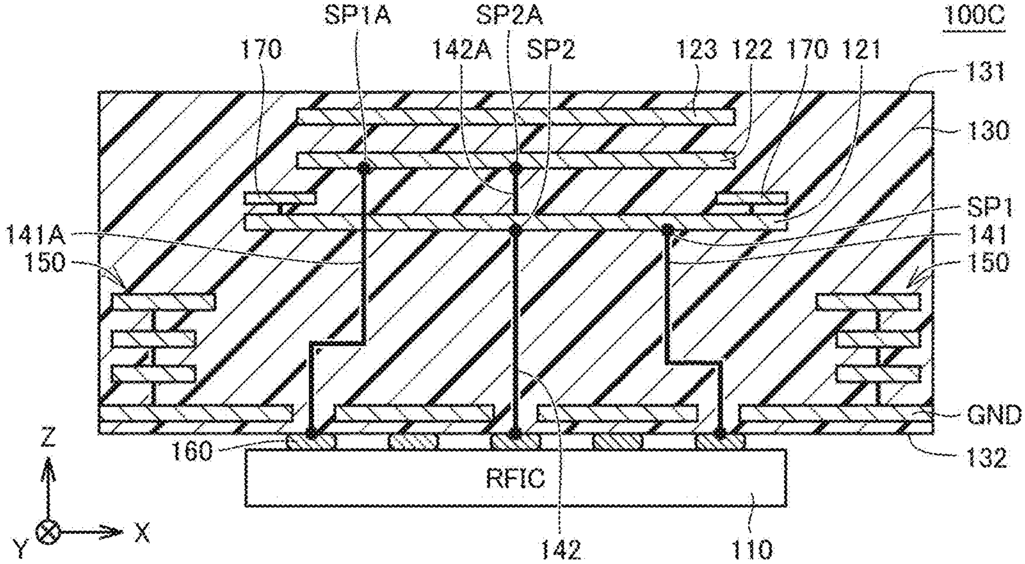
FIG. 6 is a side transparent view of an antenna module according to exemplary Embodiment 4.

FIG. 6 is a side transparent view of an antenna module 100C according to exemplary Embodiment 4. In the antenna module 100C, a parasitic element 123 is provided on the upper surface 131 side of the radiating element 122 in addition to the configuration of the antenna module 100B in exemplary Embodiment 3. Although not illustrated, when the dielectric substrate 130 is seen in plan view, the parasitic element 123 is disposed such that at least a portion thereof overlaps with the radiating elements 121 and 122. Note that, in the following description, description of components overlapping with the antenna modules 100, 100A, and 100B described in exemplary Embodiments 1 to 3 is not repeated.

The parasitic element 123 is formed to have the size substantially the same as the size of the radiating element 122. Therefore, when a radio wave is radiated from the radiating element 122, the parasitic element 123 is excited by the radiated radio wave in a vibration mode adjacent to the radio wave. Thus, a radio wave in a frequency band adjacent to a frequency band of the radiating element 122 is radiated. As a result, in terms of a radio wave, at a higher frequency, which is radiated from the radiating element 122, a frequency bandwidth can be widened.

[Modifications]

In the following modifications, variations in the shape of the peripheral electrode 150 provided for the radiating element 121 are described. Note that the shapes in the following modifications are also applicable to the peripheral electrode 170 for the radiating element 122 described in exemplary Embodiment 3.

(Modification 1)

Figure 7:
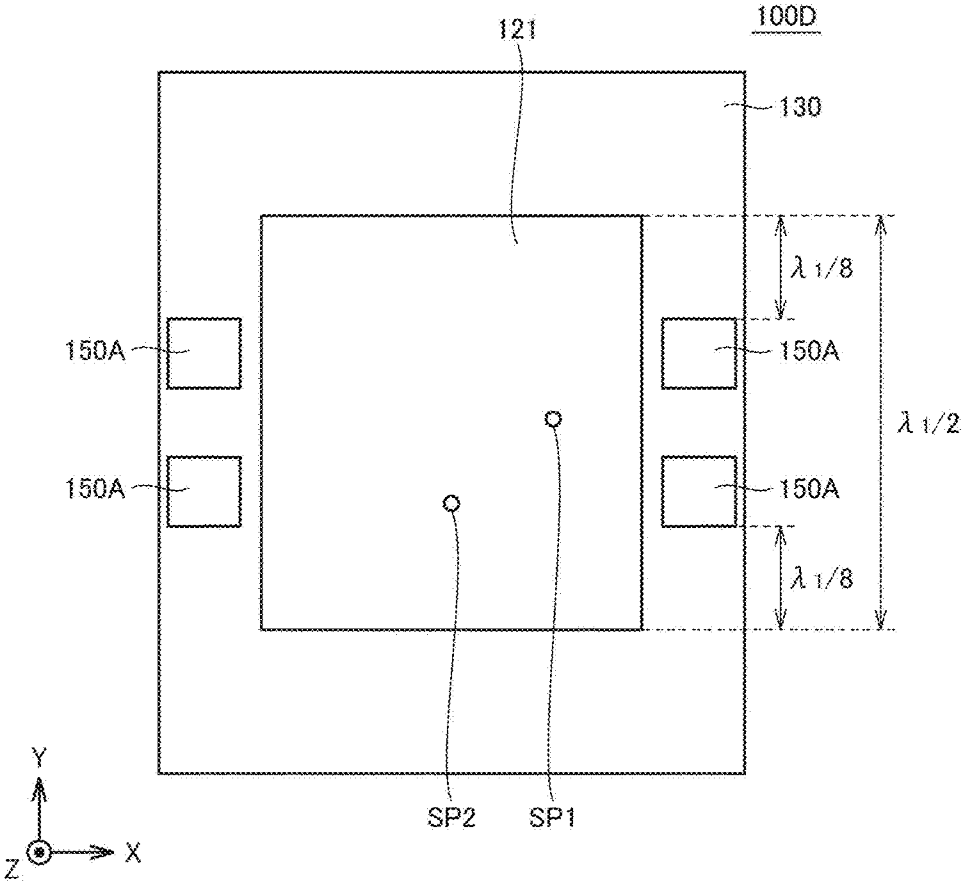
FIG. 7 is a plan view illustrating an antenna module provided with a peripheral electrode in Modification 1.

FIG. 7 is a plan view illustrating an antenna module 100D provided with a peripheral electrode 150A in Modification 1.

With reference to FIG. 7, the peripheral electrode 150A in the antenna module 100E) has a configuration in which an electrode in each layer is formed by a plurality of divided plate electrodes when the dielectric substrate 130 is seen in plan view. In the example in FIG. 7, the peripheral electrode 150A includes two electrodes disposed in parallel in the Y-axis direction.

When the wavelength of the radio wave radiated from the radiating element 121 is $\lambda_1$, among the peripheral electrodes 150A, the electrode provided at the Y-axis positive direction is disposed at a position where a distance in the Y-axis direction between the side of the radiating element 121 in the Y-axis positive direction and the electrode is at least $\lambda_1/8$. Moreover, among the peripheral electrodes 150A, the electrode provided at the Y-axis negative direction is disposed at a position where a distance in the Y-axis direction between the side of the radiating element 121 in the Y-axis negative direction and the electrode is at least $\lambda_1/8$.

Note that the peripheral electrode 150A may have a configuration in which the plate electrode is divided in each of all the lower layers, or the plate electrode(s) in one or some of the lower layer(s) is/are formed by a single integrated electrode like the peripheral electrode 150. Alternatively, the peripheral electrode may be divided into three or more plate electrodes disposed in parallel to each other.

(Modification 2)

Figure 8:
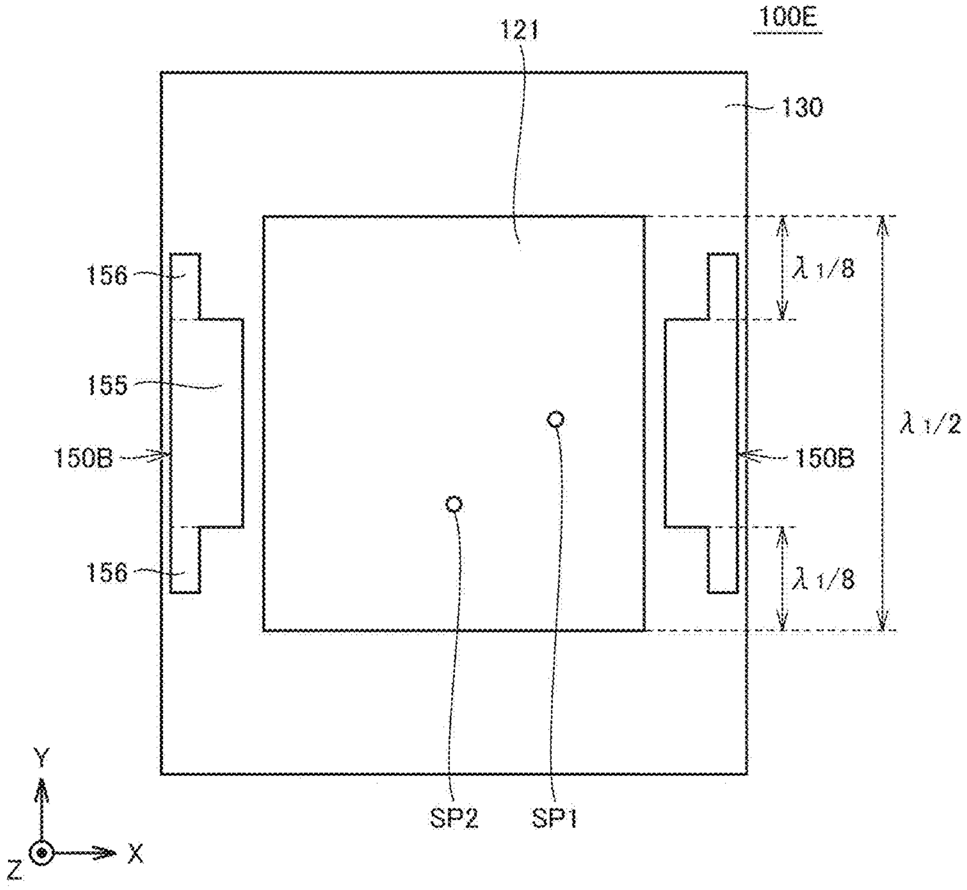
FIG. 8 is a plan view illustrating an antenna module provided with a peripheral electrode in Modification 2.

FIG. 8 is a plan view illustrating an antenna module 100E provided with a peripheral electrode 150B in Modification 2.

With reference to FIG. 8, the peripheral electrode 150B in the antenna module 100E has a shape including a first portion 155 extending in the Y-axis direction and having a rectangular shape, and second portions 156 projecting from the first portion 155 in the Y-axis positive and negative directions and each having a rectangular shape.

In the first portion 155, each of end portions of the first portion 155 in the Y-axis direction is disposed such that a distance between the end portion and the end portions of the radiating element 121 in the Y-axis direction is $\lambda_1/8$ The second portions 156 are formed along a side of the first portion 155, the side being a farther side from the radiating element 121. That is, in the peripheral electrode 150B, a dimension of a side of the first portion 155 facing to the radiating element 121 is shorter than a dimension of the peripheral electrode 150B including the second portions 156 in the Y-axis direction.

By the peripheral electrode having such a shape, in terms of an electric field which occurs in the X-axis direction of the radiating element 121, coupling between the radiating element 121 and the peripheral electrode 150B is strengthened by the second portions 156, and thus decrease in antenna characteristics can be suppressed. On the other hand, in terms of an electric field which occurs in the Y-axis direction of the radiating element 121, a distance at or larger than $\lambda_3/8$ can be secured along the Y axis between the radiating element 121 and the peripheral electrode 150B, and thus coupling between the radiating element 121 and the peripheral electrode 150B can be suppressed. Therefore, decrease in antenna characteristics of a radio wave whose polarization direction is the X-axis direction and a radio wave whose polarization direction is the Y-axis direction can be suppressed.

(Modification 3)

In the exemplary embodiments and modifications described above, the configuration is described in which the radiating element and the ground electrode are provided to the common dielectric substrate. In Modification 3, the radiating element and the ground electrode are provided to dielectric substrates different from each other.

Figure 9:
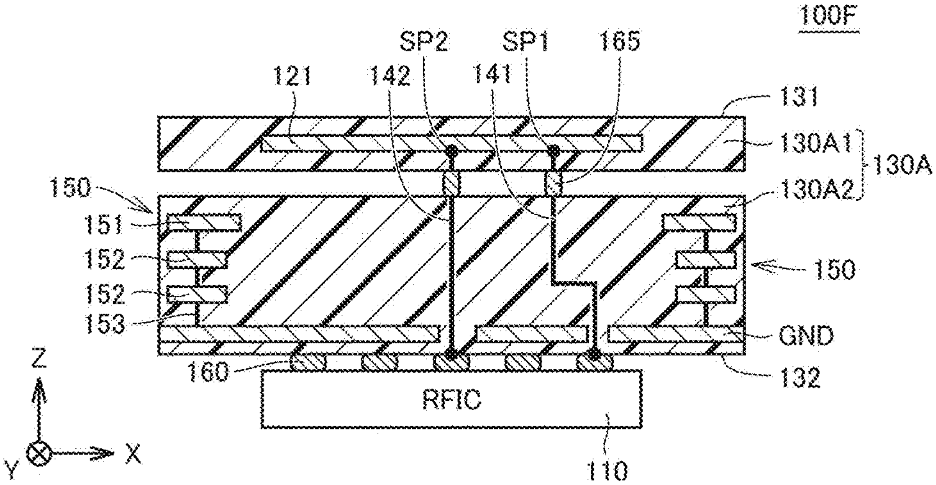
FIG. 9 is a side transparent view of an antenna module of a first example in Modification 3.

FIG. 9 is a side transparent view of an antenna module 100F of a first example in Modification 3. The antenna module 100F has a configuration in which the dielectric substrate 130 of the antenna module 100 illustrated in FIG. 2 is replaced by a dielectric substrate 130A. In FIG. 9, description of components overlapping with FIG. 2 is not repeated.

In the antenna module 100F, the dielectric substrate 130A includes a first substrate 130A1 where the radiating element 121 is disposed, and a second substrate 130A2 where the ground electrode GND and the peripheral electrode 150 are disposed. Moreover, the feed wirings 141 and 142 are connected between the first substrate 130A1 and the second substrate 130A2 by solder bumps 165.

Figure 10:
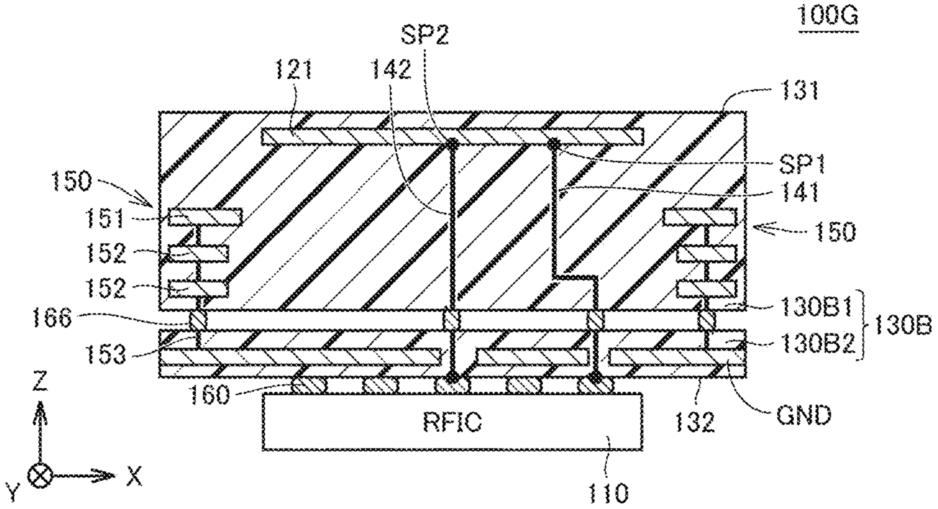
FIG. 10 is a side transparent view of an antenna module of a second example in Modification 3.

Moreover, FIG. 10 is a side transparent view of an antenna module 100G of a second example in Modification 3. The antenna module 100G has a configuration in which the dielectric substrate 130 of the antenna module 100 illustrated in FIG. 2 is replaced by a dielectric substrate 130B. Note that, also in FIG. 10, description of components overlapping with FIG. 2 is not repeated.

In the antenna module 100G, the dielectric substrate 130B includes a first substrate 13081 where the radiating element 121 and the peripheral electrode 150 are disposed, and a second substrate 130B2 where the ground electrode GND is disposed. Moreover, the vias 153 connecting the feed wirings 141 and 142 and the peripheral electrode 150 to the ground electrode GND are each connected by a solder bump 166 between the first substrate 130B1 and the second substrate 130B2.

Like the antenna modules 100F and 100G, by the dielectric substrate being configured such that the radiating element and the ground electrode are provided to the substrates different from each other, flexible arrangement becomes possible.

Note that the dielectric substrate may include three different substrates: a first substrate where the radiating element is disposed, a second substrate where the ground electrode is disposed, and a third substrate where the peripheral electrode is disposed.

Note that the "radiating element 121" and the "radiating element 122" in the embodiments described above correspond to a "first radiating element" and a "second radiating element", respectively, in the present disclosure. The "peripheral electrode 150" and the "peripheral electrode 1~70" in the embodiments correspond to a "first peripheral electrode" and a "second peripheral electrode", respectively, in the present disclosure. The "X-axis direction" and the "Y-axis direction" in the embodiments correspond to a "first polarization direction" and a "second polarization direction", respectively, in the present disclosure.

The exemplary embodiments disclosed herein are merely illustration in all respects and should not be deemed as limitation. The scope of the present disclosure is indicated not by the above description of the exemplary embodiments but by the claims, and is intended to include all the changes within the equivalent meaning and range of the claims.

REFERENCE SIGNS LIST

10 communication device
100, 100A to 100G antenna module
110 RFIC
111A to 111H, 113A to 113H, 117A, 117B switch
112AR to 112HR low noise amplifier
112AT to 112HT power amplifier
114A to 114H attenuator
115A to 115H phase shifter
116A, 116B signal combiner/splitter
118A, 11.8B mixer
119A, 119B amplifier circuit
120 antenna device
121, 121A to 121D, 122 radiating element
123 parasitic element
130, 130A, 130B dielectric substrate
130A1, 130B1 first substrate
130A2, 130B2 second substrate
141, 141A, 142, 142A feed wiring
150, 150A, 150B, 170 peripheral electrode
151, 152 plate electrode
153 via
160, 165, 166 solder bump
200 BBIC
GND ground electrode
SP1, SP1A, SP2, SP2A feed point

The invention claimed is:

1. An antenna module comprising:

a dielectric substrate including a plurality of laminated dielectric layers;

a first radiating element provided on the dielectric substrate and having a planar shape;

a ground electrode provided on the dielectric substrate to be opposed to the first radiating element; and a first peripheral electrode provided on a layer between the first radiating element and the ground electrode and electrically connected to the ground electrode, wherein the first radiating element is configured to radiate a radio wave in a first polarization direction, a dimension of the ground electrode in the first polarization direction is shorter than a dimension of the ground electrode in a specific direction orthogonal to the first; polarization direction, and when the dielectric substrate is seen in plan view in a layered direction, at least a portion of the first peripheral electrode is disposed between an end portion of the ground electrode and an end portion of the first radiating element in the first polarization direction.

2. The antenna module according to claim 1, wherein when the dielectric substrate is seen in plan view in the layered direction, the first radiating element has a rectangular shape having a first side along the first polarization direction and a second side along the specific direction, and a dimension of the first side is shorter than a dimension of the second side.

3. The antenna module according to claim 2, wherein when the dielectric substrate is seen in plan view in the layered direction, the first peripheral electrode has a rectangular shape extending along the second side at an end portion of the dielectric substrate in the first polarization direction, and a dimension of the first peripheral electrode along the second side is shorter than the dimension of the second side.

4. The antenna module according to claim 3, wherein the first radiating element is configured to radiate a radio wave in a second polarization direction that is the specific direction, and in a case that a wavelength of the radio wave radiated from the first radiating element is $\lambda_1$, the first peripheral electrode is disposed at a position where a distance in the second polarization direction between the first side and the first peripheral electrode is at least $\lambda_3/8$.

5. The antenna module according to claim 2, wherein the first peripheral electrode is disposed at an end portion of the ground electrode in the first polarization direction, and is not disposed at an end portion of the ground electrode in the specific direction.

6. The antenna module according to claim 1, wherein the first peripheral electrode includes a plurality of electrodes laminated in the layered direction of the dielectric substrate and electrically connected to the ground electrode, and among the plurality of electrodes, a first electrode has a dimension in the first polarization direction longer than a dimension of a second electrode other than the first electrode in the first polarization direction, the first electrode being provided to a layer closest to the first radiating element in the dielectric substrate.

7. The antenna module according to claim 6, wherein the first electrode is disposed such that an end portion of the first electrode on a first radiating element side is closer to the first radiating element than an end portion of the second electrode on the first radiating element side.

8. The antenna module according to claim 1, wherein the first peripheral electrode includes a plurality of electrodes disposed in parallel in the specific direction.

9. The antenna module according to claim 1, wherein the first peripheral electrode includes a first portion extending in the specific direction and having a rectangular shape, and a second portion projecting from the first portion in the specific direction, and a dimension of a side of the first portion facing to the first radiating element is shorter than a dimension of the first peripheral electrode including the second portion in the specific direction.

10. The antenna module according to claim 1, further comprising:

a second radiating element configured to radiate a radio wave in a frequency band higher than the first radiating element, wherein the first radiating element is disposed between the second radiating element and the ground electrode, and when the dielectric substrate is seen in plan view in the layered direction, the second radiating element overlaps with the first radiating element.

11. The antenna module according to claim 10, further comprising:

a second peripheral electrode provided to a layer between the first radiating element and the second radiating element and electrically connected to the first radiating element, wherein the second radiating element is configured to radiate a radio wave in the first polarization direction, and when the dielectric substrate is seen in plan view in the layered direction, at least a portion of the second peripheral electrode is disposed between the end portion of the first radiating element and an end portion of the second radiating element in the first polarization direction.

12. The antenna module according to claim 11, wherein a dimension of the second peripheral electrode in the specific direction is shorter than a dimension of the second radiating element in the specific direction.

13. The antenna module according to claim 11, wherein when the dielectric substrate is seen in plan view in the layered direction, the first radiating element has a rectangular shape having a first side along the first polarization direction and a second side along the specific direction, the second peripheral electrode has a rectangular shape extending along the second side at the end portion of the first radiating element in the first polarization direction, and at least a portion of the second peripheral electrode is disposed between the second side and the end portion of the second radiating element in the first polarization direction.

14. The antenna module according to claim 13, wherein the second radiating element is configured to radiate a radio wave also in a second polarization direction that is the specific direction, and in a case that a wavelength of the radio wave radiated from the second radiating element is $\lambda_2$, the second peripheral electrode is disposed at a position where a distance in the second polarization direction between a side of the second radiating element along the first polarization direction and the second peripheral electrode is at least $\lambda_2/8$.

15. The antenna module according to claim 10, wherein each of the first radiating element and the second radiating element is a feed element.

16. The antenna module according to claim 10, further comprising:

a parasitic element having a planar shape, wherein the second radiating element is disposed between the first radiating element and the parasitic element, and when the dielectric substrate is seen in plan view in the layered direction, at least a portion of the parasitic element overlaps with the second radiating element.

17. The antenna module according to claim 1, wherein in a case that a wavelength of the radio wave radiated from the first radiating element is $\lambda_3$, and the dielectric substrate is seen in plan view in the layered direction, a dimension in the first polarization direction from the center of the first radiating element to the ground electrode is smaller than $\lambda_1/4$.

18. A communication device comprising:

an antenna module that includes:

a dielectric substrate including a plurality of laminated dielectric layers;

a first radiating element provided on the dielectric substrate and having a planar shape;

a ground electrode provided on the dielectric substrate to be opposed to the first radiating element; and a first peripheral electrode provided on a layer between the first radiating element and the ground electrode and electrically connected to the ground electrode, wherein the first radiating element is configured to radiate a radio wave in a first polarization direction, a dimension of the ground electrode in the first polarization direction is shorter than a dimension of the ground electrode in a specific direction orthogonal to the first; polarization direction, and when the dielectric substrate is seen in plan view in a layered direction, at least a portion of the first peripheral electrode is disposed between an end portion of the ground electrode and an end portion of the first radiating element in the first polarization direction.

19. The communication device according to claim 18, comprising:

a radio frequency integrated circuit (RFIC) connected to the antenna module to supply radio frequency signals to the antenna module.

20. An antenna module comprising:

a dielectric substrate including a plurality of laminated dielectric layers;

a first radiating element provided on the dielectric substrate;

a ground electrode provided on the dielectric substrate to be opposed to the first radiating element; and a first peripheral electrode provided on a layer between the first radiating element and the ground electrode and electrically connected to the ground electrode, wherein the first radiating element is configured to radiate a radio wave in a first polarization direction, a dimension of the ground electrode in the first polarization direction is shorter than a dimension of the ground electrode in a specific direction orthogonal to the first polarization direction.

* * * * *